(12) United States Patent
Gao et al.

(10) Patent No.: US 9,344,722 B2
(45) Date of Patent: May 17, 2016

(54) SCANNING OF PREDICTION RESIDUALS IN HIGH EFFICIENCY VIDEO CODING

(71) Applicant: Futurewei Technologies, Inc., Plano, TX (US)

(72) Inventors: Wen Gao, West Windsor, NJ (US); Minqiang Jiang, Campbell, CA (US); Ye He, West Lafayette, IN (US); Jin Song, Shenzhen (CN); Haoping Yu, Carmel, IN (US)

(73) Assignee: Futurewei Technologies, Inc., Plano, TX (US)

( * ) Notice: Subject to any disclaimer, the term of this patent is extended or adjusted under 35 U.S.C. 154(b) by 756 days.

(21) Appl. No.: 13/679,184

(22) Filed: Nov. 16, 2012

(65) Prior Publication Data
US 2013/0128966 A1 May 23, 2013

Related U.S. Application Data

(60) Provisional application No. 61/561,705, filed on Nov. 18, 2011.

(51) Int. Cl.
*H04N 7/12* (2006.01)
*H04N 11/02* (2006.01)
(Continued)

(52) U.S. Cl.
CPC ....... *H04N 19/00569* (2013.01); *H04N 19/129* (2014.11); *H04N 19/157* (2014.11); *H04N 19/159* (2014.11); *H04N 19/176* (2014.11)

(58) Field of Classification Search
CPC . H04N 19/129; H04N 19/176; H04N 19/159; H04N 19/157; H04N 19/00569; H04N 19/91; H04N 19/13
See application file for complete search history.

(56) References Cited

U.S. PATENT DOCUMENTS

| 6,275,527 B1 * | 8/2001 | Bist ...................... H04N 19/176 375/240 |
| 2008/0292197 A1 * | 11/2008 | Nakagawa ........... H04N 19/105 382/238 |

(Continued)

FOREIGN PATENT DOCUMENTS

CN   101193304 A   6/2008

OTHER PUBLICATIONS

Cuiling Lan, Guangming Shi, Member, IEEE, and Feng Wu, Senior Member, IEEE, "Compress Compound Images in H.264/MPEG-4 AVC by Exploiting Spatial Correlation", IEEE Transactions on Image Processing, vol. 19, No. 4, Apr. 2010, pp. 946-957.*

(Continued)

*Primary Examiner* — Sath V Perungavoor
*Assistant Examiner* — Xiaolan Xu
(74) *Attorney, Agent, or Firm* — Conley Rose, P.C.; Grant Rodolph; Adam J. Stegge

(57) ABSTRACT

A video codec comprising a processor configured to generate a prediction block for a current block, compute a difference between the current block and the prediction block to generate a residual block, scan a plurality of prediction residuals located in the residual block following a scanning order, and if the plurality of residual values comprise at least one non-zero prediction residual, entropy encode the at least one non-zero prediction residual. A method comprising generating a prediction block for a current block, computing a difference between the current block and the prediction block to generate a residual block, scanning a plurality of prediction residuals located in the residual block, and if the plurality of residual values comprise at least one non-zero prediction residual, entropy encoding the at least one non-zero prediction residual.

8 Claims, 8 Drawing Sheets

610

620

(51) Int. Cl.
H04N 19/50 (2014.01)
H04N 19/176 (2014.01)
H04N 19/129 (2014.01)
H04N 19/157 (2014.01)
H04N 19/159 (2014.01)

(56) References Cited

U.S. PATENT DOCUMENTS

| | | | | |
|---|---|---|---|---|
| 2009/0092326 A1* | 4/2009 | Fukuhara | ............ | H04N 19/139 382/233 |
| 2011/0150072 A1* | 6/2011 | Han | ............ | H04N 19/51 375/240.01 |
| 2012/0163455 A1* | 6/2012 | Zheng | ............ | H04N 19/176 375/240.13 |

OTHER PUBLICATIONS

Panusopone et al., "Motorola Mobility's adaptive scan", Joint Collaborative Team on Video Coding (JCT.VC) of ITU-T SG16 WP3 and ISO/IEC JTC1/SC29/WG11, 5rd Meeting: Geneva, CH, Mar. 16-23, 2011.*

Bossen, F., et al., "Common Test Conditions and Software References Configurations," JCTVC-F900, Torino, Italy, Jul. 2011, 3 pages.

"Vision, Application and Requirements for High Efficiency Video Coding (HEVC)," ISO/IEC JTC1/SC29/VVG11/N11872, Daegu, Korea, Jan. 2011, 6 pages.

Murakami, T., et al., "Adaptive Picture Flipping Coding for Enhancing H.264/AVC," Picture Coding Symposium, Nov. 7, 2007, 4 pages.

Foreign Communication From A Counterpart Application, European Application No. 12849679.1, Extended European Search Report dated Apr. 10, 2015, 13 pages.

Foreign Communication From a Counterpart Application, PCT Application PCT/CN2012/084806, International Search Report dated Feb. 28, 2013, 7 pages.

Foreign Communication From A Counterpart Application, PCT Application PCT/CN2012/084806, Written Opinion dated Feb. 28, 2013, 5 pages.

Lan, et al. "Compress Compound Impages in H.264/MPGE-4 AVC by Exploiting Spatial Correlation," IEEE Transactions on Image Processing, vol. 19, No. 4, Apr. 2010, pp. 946-957.

Yeo, C., et al. "Mode-Dependent Coefficient Scanning for Intra Prediction Residual Coding," Joint Collaborative Team on Video Coding (JCT-VC) of ITU-T SG16 WP3 and ISO/IEC JTC1/SC29/WG11, JCTVC-D049, 4th Meeting: Daegu, KR, Jan. 20-28, 2011, 7 pages.

Panusopone K., et al. "Motorola Mobility's adaptive scan," Joint Collaborative Team on Video Coding (JCT-VC) of ITU-T SG16 WP3 and ISO/IEC JTC1/SC29/WG11, JCTVC-E363, 5rd Meeting: Geneva, CH, Mar. 16-23, 2011, 5 pages.

Mrak M. et al. "Transform skip mode," Joint Collaborative Team on Video Coding (JCT-VC) of ITU-T SG16 WP3 and ISO/IEC JTC1/SC29/WG11, JCTVC-F077, 6th Meeting: Torino, IT, Jul. 14-22, 2011, 6 pages.

Hsu, C., et al. "Non-CE11: Extending MDCS to 16×16 and 32×32 TUs," Joint Collaborative Team on Video Coding (JCT-VC) of ITU-T SG16 WP3 and ISO0IEC JTC1/SC29/WG11, JCTVC-G226, 7th Meeting: Geneva, CH, Nov. 21-30, 2011, 7 pages.

Foreign Communication From A Counterpart Application, European Application No. 12849679.1, Partial Supplementary European Search Report dated Dec. 22, 2014, 7 pages.

* cited by examiner

610

620

630

640 though an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

SCANNING OF PREDICTION RESIDUALS IN HIGH EFFICIENCY VIDEO CODING

CROSS-REFERENCE TO RELATED APPLICATIONS

The present application claims priority to U.S. Provisional Patent Application No. 61/561,705 filed Nov. 18, 2011, by Wen Gao et al. and entitled "New Lossless Coding Tools for High Efficiency Video Coding", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

For example, video compression may encode prediction residuals (representing a difference between an original pixel and a prediction pixel) instead of original pixels to reduce bit rate. The prediction residuals may be transformed and quantized leading to quantized transform coefficients, which may then be scanned to determine positions of non-zero coefficients. Since non-zero coefficients may typically be located in a top-left section of a transform block, existing scanning schemes may have been designed for this distribution pattern of non-zero coefficients. In schemes in which a transform may be bypassed, non-zero coefficients may not be concentrated in a top-left section. Accordingly, when scanning prediction residuals, which may have non-zero values anywhere in a residual block, the existing scanning schemes may be inefficient.

SUMMARY

In one embodiment, the disclosure includes a video codec comprising a processor configured to generate a prediction block for a current block, compute a difference between the current block and the prediction block to generate a residual block, scan a plurality of prediction residuals located in the residual block following a scanning order, and if the plurality of residual values comprise at least one non-zero prediction residual, entropy encode the at least one non-zero prediction residual.

In another embodiment, the disclosure includes a method comprising generating a prediction block for a current block, computing a difference between the current block and the prediction block to generate a residual block, scanning a plurality of prediction residuals located in the residual block following a scanning order, and if the plurality of residual values comprise at least one non-zero prediction residual, entropy encoding the at least one non-zero prediction residual.

In yet another embodiment, the disclosure includes a video codec comprising a receiver configured to receive a bitstream comprising at least one encoded prediction residual, an encoded two-bit syntax element, and an encoded full significant map and a processor coupled to the receiver and configured to perform entropy decoding on the at least one encoded prediction residual, the encoded two-bit syntax element, and the encoded full significant map to generate at least one decoded prediction residual, a decoded two-bit syntax element, and a decoded full significant map respectively, and reconstruct a residual block based on the at least one decoded prediction residual, the decoded two-bit syntax element, and the decoded full significant map.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
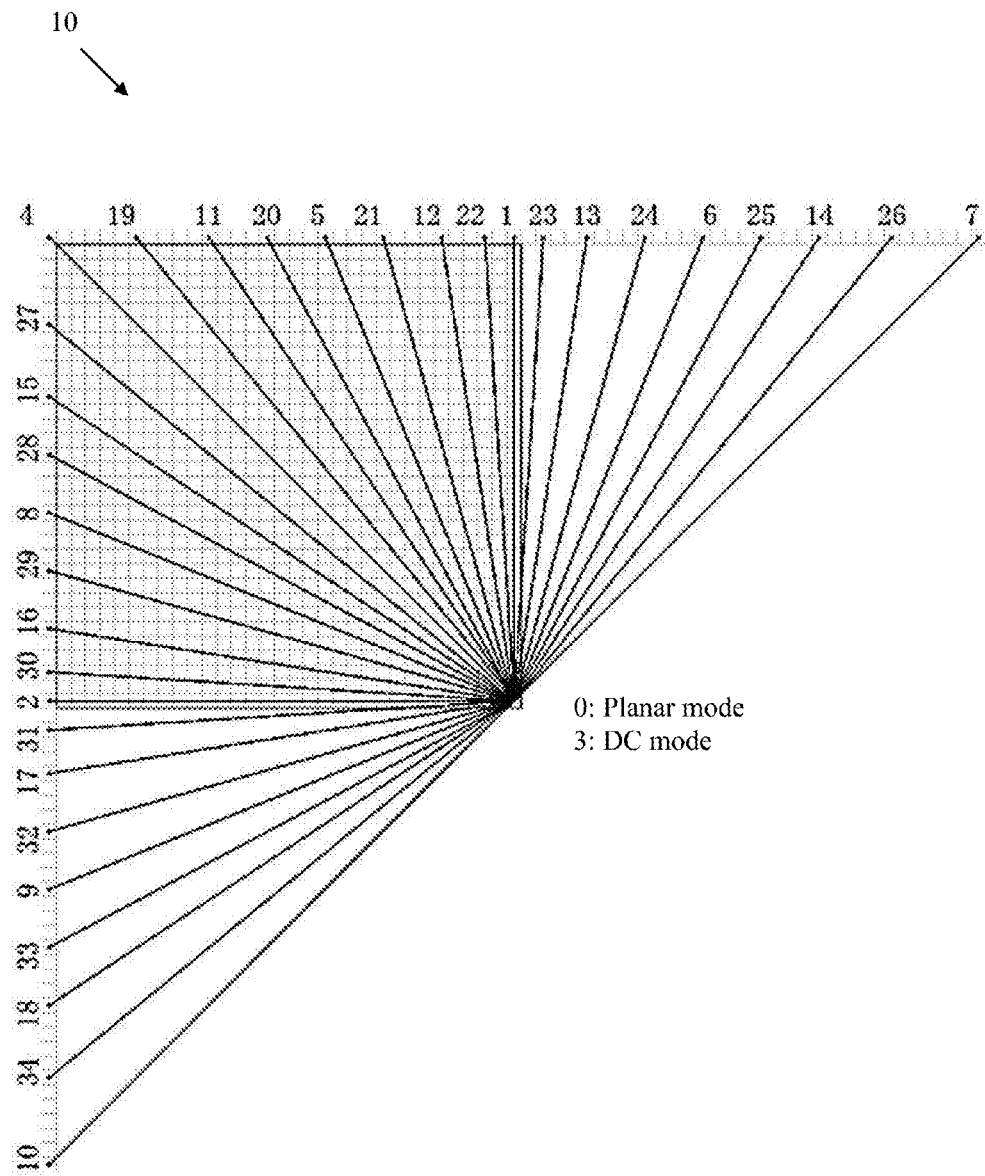
FIG. 1 is a diagram of a plurality of intra prediction modes.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video media may involve displaying a sequence of still images or frames in relatively quick succession, thereby causing a viewer to perceive motion. Each frame may comprise a plurality of picture samples or pixels, each of which may represent a single reference point in the frame. During digital processing, each pixel may be assigned an integer value (e.g., 0, 1, . . . or 255) that represents an image quality or characteristic, such as luminance (luma or Y) or chrominance (chroma including U and V), at the corresponding reference point. In use, an image or video frame may comprise a large amount of pixels (e.g., 2,073,600 pixels in a 1920×1080 frame), thus it may be cumbersome and inefficient to encode and decode (referred to hereinafter simply as code) each pixel independently. To improve coding efficiency, a video frame is usually broken into a plurality of rectangular blocks or macroblocks, which may serve as basic units of processing such as prediction, transform, and quantization. For example, a typical N×N block may comprise $N^2$ pixels, where N is an integer and often a multiple of four.

In working drafts of high efficiency video coding (HEVC), which is issued by the International Telecommunications Union (ITU) Telecommunications Standardization Sector (ITU-T) and the International Organization for Standardization (ISO)/International Electrotechnical Commission (IEC) and poised to be a future video standard, new block concepts have been introduced. For example, coding unit (CU) may refer to a sub-partitioning of a video frame into square blocks of equal or variable size. In HEVC, a CU may replace a macroblock structure of previous standards. Depending on a mode of inter or intra prediction, a CU may comprise one or more prediction units (PUs), each of which may serve as a basic unit of prediction. For example, for intra prediction, a 64×64 CU may be symmetrically split into four 32×32 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

Successive video frames or slices may be substantially correlated, such that a block in a frame does not substantially vary from a corresponding block in a previously coded frame. Inter-frame prediction (in short as inter prediction) may exploit temporal redundancies in a sequence of frames, e.g. similarities between corresponding blocks of successive frames, to reduce compression data. In inter prediction, a motion-compensated algorithm may be implemented to calculate a motion vector for a current block in a current frame based on a corresponding block located in one or more reference frames preceding the current frame according to an encoding order.

Similarly, within a video frame, a pixel may be correlated with other pixels within the same frame such that pixel values within a block or across some blocks may vary only slightly and/or exhibit repetitious textures. To exploit spatial correlations between neighboring blocks in the same frame, intra-frame prediction (in short as intra prediction) may be implemented by a video encoder/decoder (codec) to interpolate a prediction block (or predicted block) from one or more previously coded neighboring blocks, thereby creating an estimation of the current block. The encoder and decoder may interpolate the prediction block independently, thereby enabling a substantial portion of a frame and/or image to be reconstructed from the communication of a relatively few number of reference blocks, e.g., blocks positioned in (and extending from) the upper-left hand corner of the frame.

To harness these coding efficiencies, video/image coding standards may improve prediction accuracy by utilizing a plurality of prediction modes during intra prediction, each of which may generate a unique texture. FIG. 1 is a diagram of a plurality of intra prediction modes 10 (also referred hereafter as intra modes), which may be used in a HEVC unified intra prediction (UIP) scheme. For the luma component, the intra prediction modes 10 may comprise up to 35 intra prediction modes, which may include 33 directional modes and 2 non-directional modes, such as a direct current (DC) prediction mode and a planar prediction mode. Each mode may be assigned a mode name, which may be application dependent. In HEVC, the planar mode may be assigned or appointed as mode 0, the DC mode as mode 3, the horizontal mode as mode 2, and so forth. While FIG. 1 shows 35 intra prediction modes for the luma component (i.e., Y), depending on block-size, intra prediction scheme, and/or video coding standard, any other number of prediction modes may also be used. For each of the two chroma components (i.e., U and V), up to 6 intra prediction modes may be used, which include a chroma from luma prediction mode (often referred to as a linear method (LM) mode), a vertical prediction mode, a horizontal prediction mode, a diagonal mode, a DC mode, and a direct mode (DM) derived from the luma component. In the DM mode, a chroma block uses the same intra prediction mode as its corresponding luma block.

As shown in FIG. 1, the 33 directional modes may be symmetrical about the vertical, horizontal, and diagonal directions. Accordingly, only 9 directions may be needed to represent the 33 directions, and the other 24 directions may be obtained via addition, subtraction, and/or shifting operations. For example, 9 modes including modes 1, 23, 13, 24, 6, 25, 14, 26, and 7 may be used, which range from 45 degrees (zero degree means right horizontal side) to 90 degrees. Each of the 9 modes has a pre-defined angle with the right horizontal line. In HEVC, the angles may be defined as arccot(k/32), wherein k has values of 0, 2, 5, 9, 13, 17, 21, 26, and 32 corresponding to the 9 modes 1, 23, 13, 24, 6, 25, 14, 26, and 7, respectively. For example, the mode 14 has an angle of arccot(21/32)=56.7 degrees.

After intra prediction, an encoder may compute a difference between the prediction block and the original block (e.g., by subtracting the prediction block from the original block) to produce a residual block. Since an amount of data needed to represent the residual block may typically be less than an amount of data needed to represent the original block, the residual block may be encoded instead of the original block to achieve a higher compression ratio. In existing HEVC software models (HMs), prediction residuals of the residual block in a spatial domain may be converted to transform coefficients of a transform matrix in a frequency domain. The conversion may be realized through a two-dimensional transform, e.g. a transform that closely resembles or is the same as discrete cosine transform (DCT). In the transform matrix, low-index transform coefficients (e.g., in a top-left section), e.g., corresponding to big spatial features with low spatial frequency components, may have relatively high magnitudes, while high-index transform coefficients (e.g., in a bottom-right section), e.g., corresponding to small spatial features with high spatial frequency components, may have relatively small magnitudes.

Further, in a quantization operation that follows the transform, a number of high-index transform coefficients may be reduced to zero, which may be skipped in subsequent encoding steps. Since zero transform coefficients may be concentrated in a bottom-right section of the transform matrix, an end of block (EOB) symbol may be used to indicate a last non-zero transform coefficient.

To determine the EOB position and potentially positions of other non-zero transform coefficients, in current HMs (e.g., HM 4.0), mode dependent coefficient scanning (MDCS) may be used in intra coding. There may be three scanning patterns or orders, including a zigzag pattern (denoted by index 0), a horizontal pattern (denoted by index 1), and a vertical pattern (denoted by index 2). The main idea of MDCS is that for relatively small TUs, e.g. an 8×8 or 4×4 TU, when intra prediction is performed, for example, in the vertical direction (i.e., mode 1 in FIG. 1), the transformed coefficients may often appear in a top horizontal section of the transform matrix. In this case, a horizontal scanning order may help reduce a total number of bits needed to encode a significant map and the EOB. Similarly, when intra prediction is performed in the horizontal direction (i.e., mode 2 in FIG. 1), vertical scanning of transform coefficients may be more efficient. Based on this idea, a mapping or lookup table was adopted into HM 4.0, as shown in Table 1. It can be seen that the scanning pattern may be chosen based on the intra prediction mode and the size of a TU.

To improve efficiency of encoding the full significant map, a mode dependent residual scanning (MDRS) scheme is disclosed herein, which determines a starting position and/or a scanning order based on a prediction mode. For example, in inter prediction, the starting prediction may be any of the four corners of the residual block, and a two-bit syntax element may be used to specify the starting position. In intra prediction, the scanning order may depend on an intra prediction mode. Depending on whether a size of a prediction block (or residual block) is no greater than a pre-configured limit and whether an intra prediction mode is in a horizontal, vertical, or diagonal group, various scanning orders including horizontal, vertical, and zigzag order may be implemented.

Figure 2:
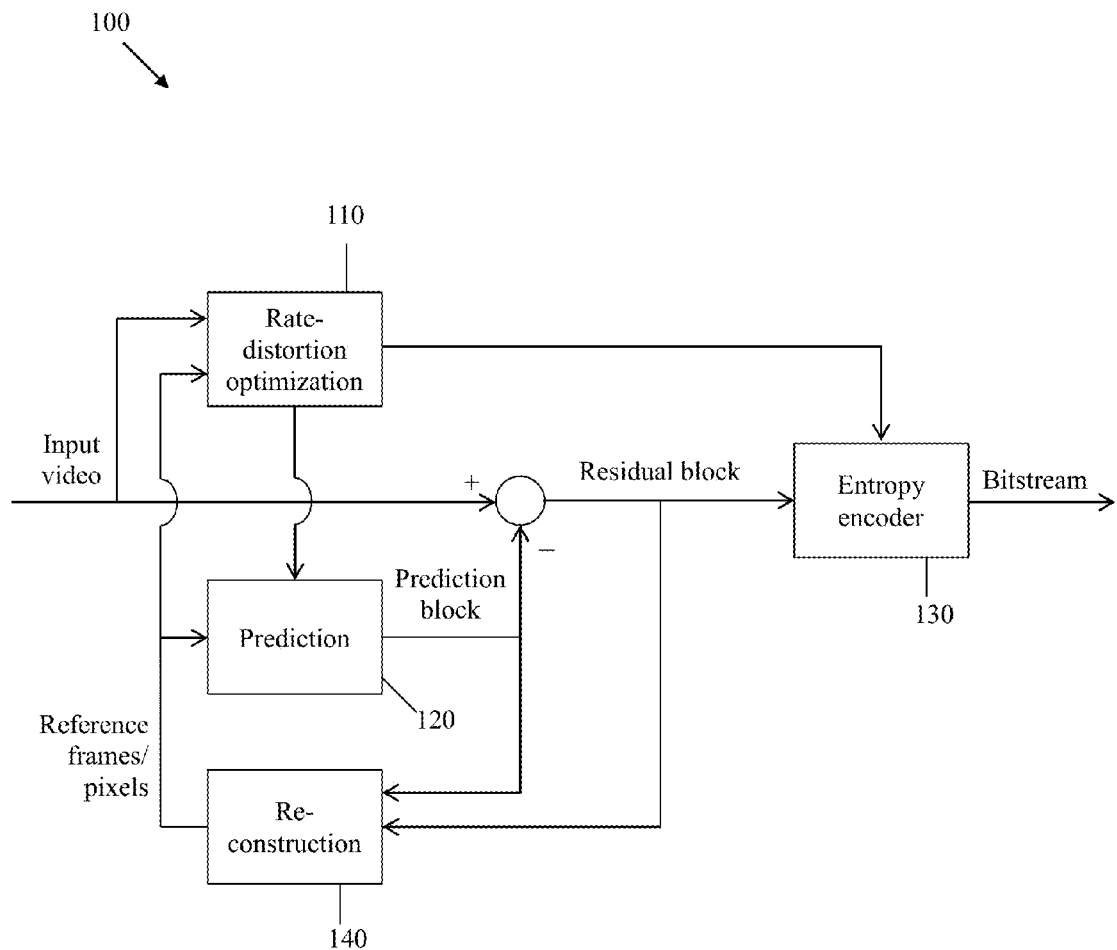
FIG. 2 is a schematic diagram of an embodiment of a transform bypass encoding scheme.

FIG. 2 illustrates an embodiment of a transform bypass encoding scheme 100, which may be implemented in a video encoder. The transform bypass encoding scheme 100 may

TABLE 1

MDCS mapping table in HM4.0

| TU size | Mode | | | | | | | | | | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 |
| 32 × 32 | 0 | 0 | 0 | 0 | 0 | 0 | 0 | 0 | 0 | 0 | 0 | 0 | 0 | 0 | 0 | 0 | 0 | 0 | 0 |
| 16 × 16 | 0 | 0 | 0 | 0 | 0 | 0 | 0 | 0 | 0 | 0 | 0 | 0 | 0 | 0 | 0 | 0 | 0 | 0 | 0 |
| 8 × 8 | 0 | 1 | 2 | 0 | 0 | 1 | 1 | 0 | 2 | 2 | 0 | 0 | 1 | 1 | 0 | 0 | 2 | 2 | 0 |
| 4 × 4 | 0 | 1 | 2 | 0 | 0 | 1 | 1 | 0 | 2 | 2 | 0 | 0 | 1 | 1 | 0 | 0 | 2 | 2 | 0 |

| TU size | Mode | | | | | | | | | | | | | | | |
|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 |
| 32 × 32 | 0 | 0 | 0 | 0 | 0 | 0 | 0 | 0 | 0 | 0 | 0 | 0 | 0 | 0 | 0 | 0 |
| 16 × 16 | 0 | 0 | 0 | 0 | 0 | 0 | 0 | 0 | 0 | 0 | 0 | 0 | 0 | 0 | 0 | 0 |
| 8 × 8 | 0 | 0 | 1 | 1 | 1 | 1 | 0 | 0 | 0 | 0 | 2 | 2 | 2 | 2 | 0 | 0 |
| 4 × 4 | 0 | 0 | 1 | 1 | 1 | 1 | 0 | 0 | 0 | 0 | 2 | 2 | 2 | 2 | 0 | 0 |

The scanning scheme in current HMs may have been designed for scanning of quantized transform coefficients, which normally have higher absolute values in specific regions or sections of the transform block (e.g., in the top-left section). However, the transform block may not be present in some coding schemes, in which case, prediction residuals may be directly scanned and encoded. Whether quantized or not, prediction residuals may exhibit different statistics properties from transform coefficients. For example, prediction residuals with high absolute values may appear anywhere in a residual block, e.g., in the bottom-right section or top-right section. This distribution pattern may be different compared to transform coefficients, which typically have small or zero absolute values in the bottom right section. Consequently, the existing scanning scheme may need to be modified in order to fit the distribution pattern of non-zero prediction residuals.

Disclosed herein are systems and methods for improved scanning of prediction residuals. In this disclosure, transform bypass coding schemes may be used to realize lossless coding, and transform without quantization coding schemes (sometimes referred to as a transform skip scheme) may be used to realize near lossless coding. In these schemes, prediction residuals, either quantized or un-quantized, may be encoded directly using an entropy encoder. Without a transform step to concentrate non-zero residual values in the top-left corner of the transform matrix, non-zero prediction residuals may behave differently, e.g., appearing in random positions of the residual block. Before encoding the non-zero prediction residuals, all prediction residuals may be scanned to generate a full significant map indicating positions of the non-zero prediction residuals and zero prediction residuals.

comprise a rate-distortion optimization (RDO) module 110, a prediction module 120, an entropy encoder 130, and a reconstruction module 140 arranged as shown in FIG. 2. In operation, an input video comprising a sequence of video frames (or slices) may be received by the encoder. Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 110 may be configured to make logic decisions for one or more of other modules. In an embodiment, based on one or more previously encoded frames, the RDO module 110 may determine how a current frame (or slice) being encoded is partitioned into a plurality of CUs, and how a CU is partitioned into one or more PUs and TUs. For example, homogeneous regions of the current frame (i.e., no or slight difference among the pixel values in the regions) may be partitioned into relatively larger blocks, and detailed regions of the current frame (i.e., significant difference among the pixel values in the regions) may be partitioned into relatively smaller blocks. In addition, the RDO module 110 may control the prediction module 120 by determining how the current frame is predicted. The current frame may be predicted via inter and/or intra prediction. Inter prediction may be implemented using motion-compensated algorithms. Intra prediction may be implemented using any of a plurality of available prediction modes or directions (e.g., 35 modes for the luma component in HEVC), which may be determined by the RDO module 110. For example, the RDO module 110 may calculate a sum of absolute difference (SAD) for all intra prediction modes or a sub-set of the intra prediction modes, and select an intra prediction mode that results in the smallest SAD.

Based on logic decisions made by the RDO module 110, the prediction module 120 may utilize either one or more reference frames (inter prediction) or a plurality of reference pixels (intra prediction) to generate a prediction block, which may be an estimate of a current block. Then, the current block may be subtracted by the prediction block, thereby generating a residual block. The residual block may comprise a plurality of residual values, each of which may indicate a difference between a pixel in the current block and a corresponding pixel in the prediction block. Residual value and prediction residual may be used herein interchangeably. Then, all values of the residual block may be scanned, and locations of non-zero residual values may be determined. Scanning of the residual values starts from a starting position and follows a particular scanning order. The starting position and/or the scanning order may be determined based on the prediction mode used to generate the prediction block and a size of the prediction block. For example, if the residual block was generated via inter prediction, the starting position may be any of the four corners of the residual block, and the scanning order may be a horizontal order or a zigzag order. For another example, if the residual block was generated via intra prediction, the starting position may be the left-top corner pixel of the residual block, and the scanning order may be a horizontal, vertical, or zigzag order.

In an embodiment, a full significant map indicating the locations of each non-zero residual value and each zero residual value may be generated after scanning. Then, the full significant map and the non-zero residual values may be encoded by the entropy encoder 130 and inserted into an encoded bitstream. The entropy encoder 130 may employ any entropy encoding scheme, such as context-adaptive binary arithmetic coding (CABAC) encoding, exponential Golomb encoding, or fixed length encoding, or any combination thereof. In the transform bypass encoding scheme 100, since the residual block is encoded without a transform step or a quantization step, no information loss may be induced in the encoding process.

To facilitate continuous encoding of video frames, the residual block may also be fed into the reconstruction module 140, which may generate either reference pixels for intra prediction of future blocks or reference frames for inter prediction of future frames. If desired, filtering may be performed on the reference frames/pixels before they are used for inter/intra prediction. A person skilled in the art is familiar with the functioning of the prediction module 120 and the reconstruction module 140, so these modules will not be further described. It should be noted that FIG. 1 may be a simplified illustration of a video encoder, thus it may only include a portion of modules present in the encoder. Other modules (e.g., filter, scanner, and transmitter), although not shown in FIG. 1, may also be included to facilitate video encoding. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 3:
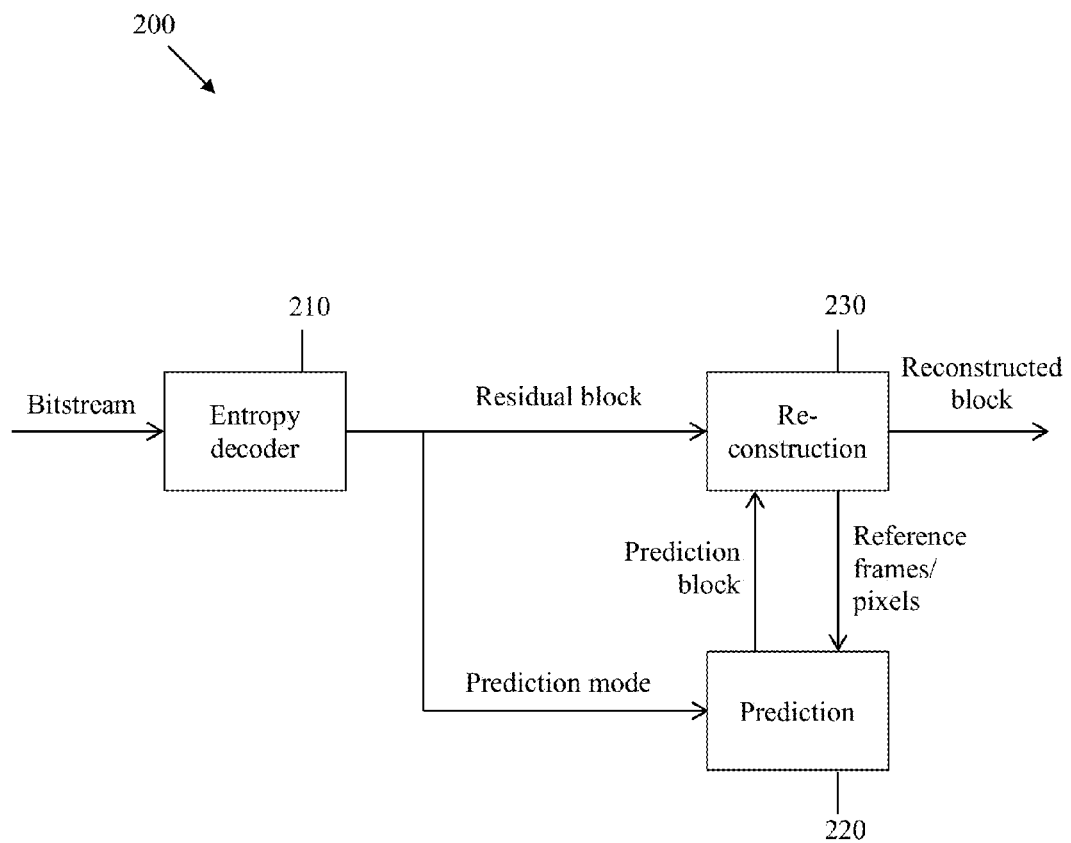
FIG. 3 is a schematic diagram of an embodiment of a transform bypass decoding scheme.

FIG. 3 illustrates an embodiment of a transform bypass decoding scheme 200, which may be implemented in a video decoder. The transform bypass decoding scheme 200 may correspond to the transform bypass encoding scheme 100, and may comprise an entropy decoder 210, a prediction module 220, and a reconstruction module 230 arranged as shown in FIG. 3. In operation, an encoded bitstream containing information of a sequence of video frames may be received by the entropy decoder 210, which may decode the bitstream to an uncompressed format. Non-zero encoded residual values may be decoded by the entropy decoder 210. The entropy decoder 210 may employ any entropy decoding scheme, such as CABAC decoding, exponential Golomb decoding, or fixed length encoding, or any combination thereof.

For a current block being decoded, a residual block may be generated after the execution of the entropy decoder 210. To properly place each non-zero residual pixels, a full significant map decoded by the entropy decoder 210 may be used. In addition, information containing a prediction mode may also be decoded by the entropy decoder 210. Then, based on the prediction mode, the prediction module 220 may generate a prediction block. If the decoded prediction mode is an inter mode, one or more previously decoded reference frames may be used to generate the prediction block. Otherwise if the decoded prediction mode is an intra mode, a plurality of previously decoded reference pixels may be used to generate the prediction block. Then, the reconstruction module 230 may combine the residual block with the prediction block to generate a reconstructed block. Additionally, to facilitate continuous decoding of video frames, the reconstructed block may be used in a reference frame to inter predict future frames. Some pixels of the reconstructed block may also serve as reference pixels for intra prediction of future blocks in the same frame.

In use, if an original block is encoded and decoded using lossless schemes, such as the transform bypass encoding scheme 100 and the transform bypass decoding scheme 200, no information loss may be induced in the entire coding process. Thus, barring distortion caused during transmission, a reconstructed block may be exactly the same with the original block. This high fidelity of coding may improve a user's experience in viewing video contents such as texts and graphics in a compound video.

Figure 4:
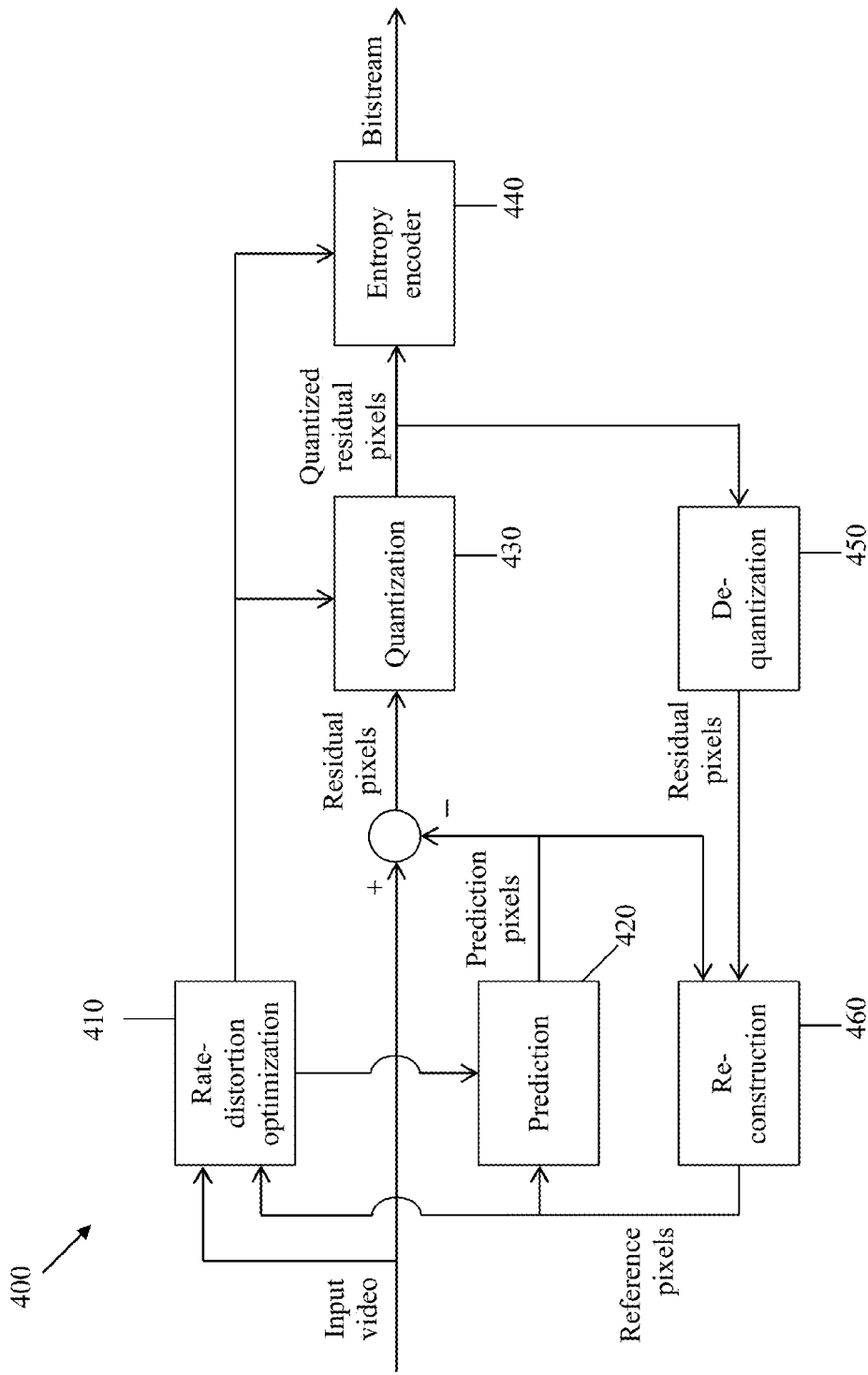
FIG. 4 is a schematic diagram of an embodiment of a transform without quantization encoding scheme.

Sometimes it may be desirable to include a quantization step, but not a transform step, into the encoding process. FIG. 4 illustrates an embodiment of a quantization without transform encoding scheme 400 (sometimes referred to as a transform skip scheme), which may be implemented in a video encoder. The quantization without transform encoding scheme 400 may comprise a RDO module 410, a prediction module 420, a quantization module 430, an entropy encoder 440, a de-quantization module 450, and a reconstruction module 460. Some aspects of the quantization without transform encoding scheme 400 may be the same or similar to the transform bypass encoding scheme 100 in FIG. 2, thus further description may focus on different aspects in the interest of conciseness.

The quantization without transform encoding scheme 400 may be implemented in a video encoder, which may receive an input video comprising a sequence of video frames. The RDO module 410 may be configured to control one or more of other modules. Based on logic decisions made by the RDO module 410, the prediction module 420 may utilize both external and internal reference pixels to generate prediction pixels for a current block. Each prediction pixel may be subtracted from a corresponding original pixel in the current block, thereby generating a residual pixel. After all residual pixels have been computed to obtain a residual block, the residual block may go through the quantization module 430. Scales of the residual values may be altered, e.g., each residual value divided by a factor of five. As a result, some non-zero residual values may be converted into zero residual values (e.g., values less than a certain threshold deemed as zero).

After all quantized residual pixels have been generated for the current block, the quantized residual pixels may be scanned, and locations of non-zero quantized residual values may be determined. Scanning of the residual values starts from a starting position and follows a particular scanning order. The starting position and/or the scanning order may be determined based on a size of the prediction block and the prediction mode used to generate the prediction block. For example, if the residual block was generated via inter prediction, the starting position may be any of the four corners of the quantized residual block, and the scanning order may be a horizontal order or a zigzag order. For another example, if the residual block was generated via intra prediction, the starting position may be the left-top corner pixel of the quantized residual block, and the scanning order may be a horizontal, vertical, or zigzag order.

In an embodiment, a full significant map indicating the locations of each quantized non-zero residual value and each zero quantized residual value may be generated after scanning. Then, the full significant map and the non-zero residual values may be encoded by the entropy encoder 130 and inserted into an encoded bitstream. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 5:
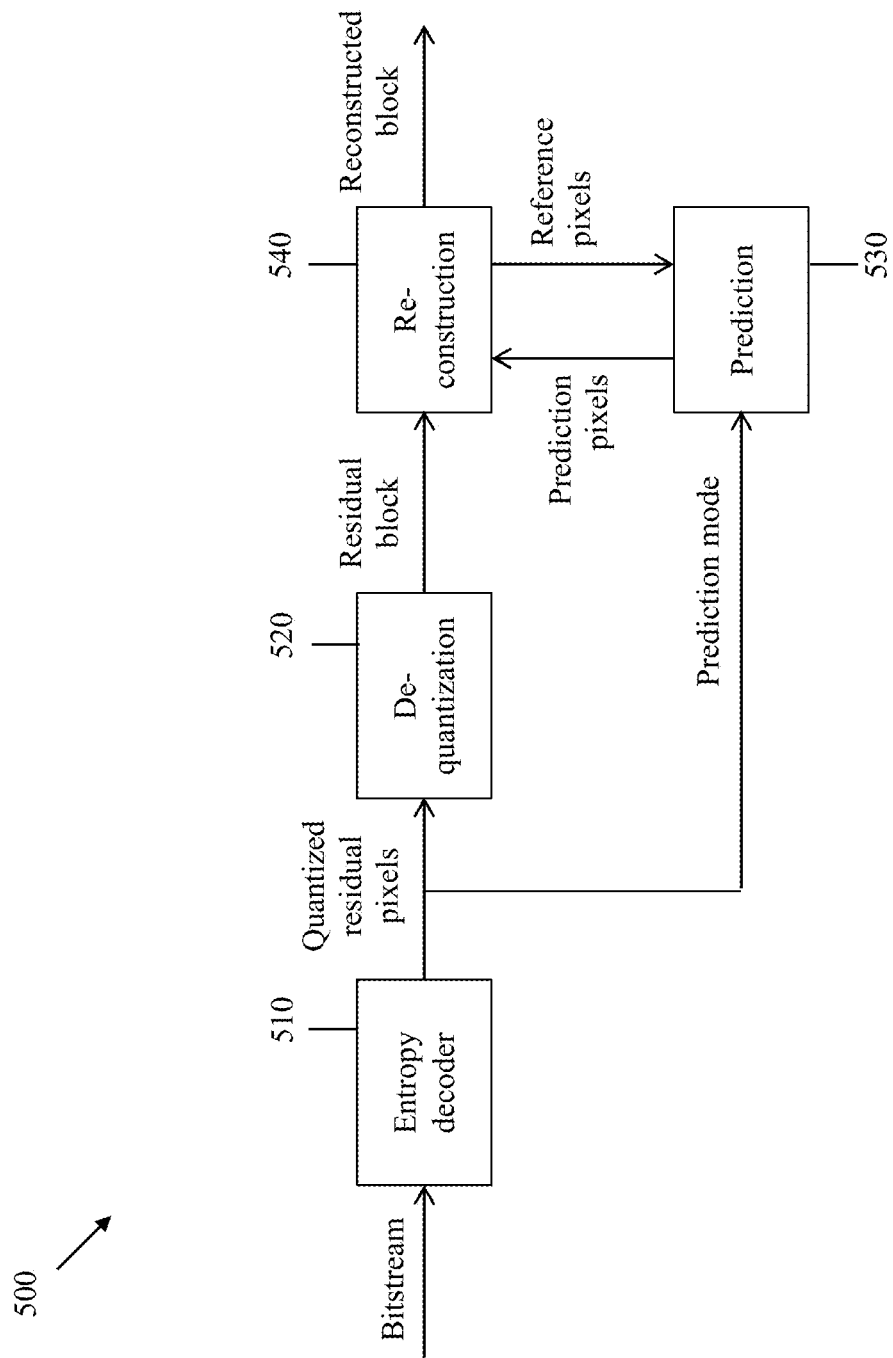
FIG. 5 is a schematic diagram of an embodiment of a transform without quantization decoding scheme.

FIG. 5 illustrates an embodiment of a quantization without transform decoding scheme 500, which may be implemented in a video decoder. The transform bypass decoding scheme 500 may correspond to the quantization without transform encoding scheme 400, and may comprise an entropy decoder 510, a de-quantization module 520, a prediction module 530, and a reconstruction module 540 arranged as shown in FIG. 5. In operation, an encoded bitstream containing information of a sequence of video frames may be received by the entropy decoder 510, which may decode the bitstream to an uncompressed format. Non-zero quantized encoded residual values may be decoded by the entropy decoder 510.

For a current block being decoded, a residual block may be generated after the execution of the entropy decoder 510. To properly place each non-zero quantized residual pixels into the residual block, a full significant map decoded by the entropy decoder 510 may be used. Then, quantized residual values may be fed into the de-quantization module 520, which may recover a scale of the residual values (e.g., multiply each residual value by a factor of 5). Note that after quantization and de-quantization, residual values may not completely recover to their original values, thus some information loss may be induced in the coding process.

In addition, information containing a prediction mode may also be decoded by the entropy decoder 510. Based on the prediction mode, the prediction module 530 may generate a prediction block. If the decoded prediction mode is an inter mode, one or more previously decoded reference frames may be used to generate the prediction block. Otherwise if the decoded prediction mode is an intra mode, a plurality of previously decoded reference pixels may be used to generate the prediction block. Then, the reconstruction module 230 may combine the residual block with the prediction block to generate a reconstructed block. Additionally, to facilitate continuous decoding of video frames, the reconstructed block may be used in a reference frame to inter predict future frames. Some pixels of the reconstructed block may also serve as reference pixels for intra prediction of future blocks in the same frame.

When a transform step is skipped, e.g., in the transform bypass encoding scheme 100 or the quantization without transform encoding scheme 400, prediction residuals instead of transform coefficients may be scanned and then encoded. Whether quantized or not, prediction residuals may exhibit different statistics properties from transform coefficients. For example, in intra prediction, residual pixels may not behave the same as transform coefficients. Instead, for relatively small blocks (e.g., a TU with a size of 8×8 or 4×4), when intra prediction is performed in the vertical direction (e.g., mode 1 in FIG. 1), the prediction residuals may appear in the vertical direction. In other words, it may be more likely for prediction residuals located in the same column to have identical or similar pixel values. Accordingly, a vertical scanning order or pattern may be implemented, in which case the prediction residuals are scanned column-by-column. Further, the vertical scan may start from any of the four corners of the residual block, depending on the starting position. Suppose that the starting position is the top-left pixel with index (0, 0), the vertical scan may first scan the 0-th column from top to bottom, then scan the 1-th column from top to bottom, . . . , at last scan the (N−1)-th column from top to bottom. Vertical scanning of the prediction residuals may reduce a total number of bits needed to encode a full significant map, thereby achieving higher coding efficiency.

Similarly, for relatively small blocks (e.g., a TU with a size of 8×8 or 4×4), when intra prediction is performed in the horizontal direction (e.g., mode 2 in FIG. 1), the prediction residuals may appear in the horizontal direction. In other words, it may be more likely for prediction residuals located in the same row to have identical or similar pixel values. Accordingly, a horizontal scanning order or pattern may be implemented, in which case the prediction residuals are scanned row-by-row. Further, the horizontal scan may start from any of the four corners of the residual block, depending on the starting position. Suppose that the starting position is the top-left pixel with index (0, 0), the horizontal scan may first scan the 0-th row from left to right, then scan the 1-th row from left to right, . . . , and at last scan the (N−1)-th row from left to right. In this case, horizontal scanning may help improve coding efficiency.

When intra prediction is performed in a diagonal direction (e.g., modes 4, 7, and 10 in FIG. 1), the prediction residuals may be scanned following a zigzag order. The zigzag scan may start from any of the four corners of the residual block, depending on the starting position. In addition, there may be other intra prediction directions (e.g., up to 33 directional modes in HEVC for the luma component), which may be classified into a vertical, horizontal, or diagonal group based on their relative proximity with a vertical, horizontal, or diagonal axis. For example, if an intra prediction direction has an angle smaller than a pre-determined threshold with the vertical axis, the intra prediction direction may be classified as in the vertical group, and the residual values may be scanned following a vertical order. Otherwise, if the intra prediction direction has an angle smaller than a pre-determined threshold with the horizontal axis, the intra prediction direction may be classified as in the horizontal group, and the residual values may be scanned following a horizontal order. Otherwise, if the intra prediction direction has an angle smaller than a pre-determined threshold with a diagonal direction, the intra prediction direction may be classified as in the diagonal group, and the residual values may be scanned following a zigzag order.

Since the scanning order depends on an intra prediction mode, as well as the size of a block (e.g., a TU), the scanning scheme may be referred as a mode dependent residual scan (MDRS). A mapping table may be used to help determine which scanning order should be used with a given intra prediction mode and TU size. Table 2 shows an embodiment of a mapping table, which includes three scanning patterns: a zigzag pattern (denoted by index 0), a horizontal pattern (denoted by index 1), and a vertical pattern (denoted by index 2).

TABLE 2

MDRS mapping table for prediction residuals

| TU size | Mode | | | | | | | | | | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 |
| 32 × 32 | 0 | 0 | 0 | 0 | 0 | 0 | 0 | 0 | 0 | 0 | 0 | 0 | 0 | 0 | 0 | 0 | 0 | 0 | 0 |
| 16 × 16 | 0 | 0 | 0 | 0 | 0 | 0 | 0 | 0 | 0 | 0 | 0 | 0 | 0 | 0 | 0 | 0 | 0 | 0 | 0 |
| 8 × 8 | 0 | 2 | 1 | 0 | 0 | 2 | 2 | 0 | 1 | 1 | 0 | 0 | 2 | 2 | 0 | 0 | 1 | 1 | 0 |
| 4 × 4 | 0 | 2 | 1 | 0 | 0 | 2 | 2 | 0 | 1 | 1 | 0 | 0 | 2 | 2 | 0 | 0 | 1 | 1 | 0 |

| TU size | Mode | | | | | | | | | | | | | | | |
|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 |
| 32 × 32 | 0 | 0 | 0 | 0 | 0 | 0 | 0 | 0 | 0 | 0 | 0 | 0 | 0 | 0 | 0 | 0 |
| 16 × 16 | 0 | 0 | 0 | 0 | 0 | 0 | 0 | 0 | 0 | 0 | 0 | 0 | 0 | 0 | 0 | 0 |
| 8 × 8 | 0 | 0 | 2 | 2 | 2 | 2 | 0 | 0 | 0 | 0 | 1 | 1 | 1 | 1 | 0 | 0 |
| 4 × 4 | 0 | 0 | 2 | 2 | 2 | 2 | 0 | 0 | 0 | 0 | 1 | 1 | 1 | 1 | 0 | 0 |

Note that Table 2 uses the mode numbers specified in FIG. 1. Each combination of intra prediction mode and TU size determines a scanning pattern for the prediction residuals. For example, if the intra mode 24 is used for a 8×8 TU, a vertical pattern may be used to scan the prediction residuals. It can be seen from Table 2 that if an angle between an intra prediction direction and the vertical direction (i.e., direction of mode 1) is smaller than $\pi/8$ radians or 22.5 degrees, the intra prediction direction is classified in the vertical group. In this case, 22.5 degrees is the pre-determined threshold. According to FIG. 1, modes 5, 21, 12, 22, 1, 23, 13, 24, and 6 belong to this group. In the vertical group, mode 5 and mode 6 have the largest angle with the vertical direction (arctan(13/32)=22.1 degrees), which is still smaller than 22.5 degrees. Similarly, if an angle between the intra prediction direction and the horizontal direction (i.e., direction of mode 2) is smaller than 22.5 degrees, the intra prediction direction is classified in the horizontal group. According to FIG. 1, modes 9, 32, 17, 31, 2, 30, 16, 29, and 8 belong to this group. Otherwise, if an angle between the intra prediction direction and a diagonal direction (i.e., directions of modes 4, 7, and 10) is smaller than 22.5 degrees, the intra prediction direction is classified in the diagonal group. According to FIG. 1, modes 10, 34, 18, 33, 28, 15, 27, 4, 19, 11, 20, 25, 14, 26, and 7 belong to this group. For a relatively small block (e.g., an 8×8 or 4×4 TU), the scanning order may depend on an intra prediction direction. However, for a relatively large block (e.g., a 32×32 or 16×16 TU), a zigzag scanning order may be used regardless of the intra prediction direction. Further, for the DC mode (mode 3 in FIG. 1) and the planar mode (mode 0 in FIG. 1), a zigzag scanning order may be used for all block sizes. Comparing with Table 1 which is currently used in HMs, Table 2 may be a simple switch of the position of 1's and 2's.

It should be noted that additional changes may be made to Table 1 without departing from the principles of the present disclosure. For example, if there is an additional intra prediction direction being incorporated, the additional direction may be classified into a vertical, horizontal, or diagonal group accordingly using the standard set above. Further, additional sizes of TUs or other blocks may be added, e.g., including 64×64 blocks. The standard of small blocks and large blocks may be altered depending on the application. Likewise, the pre-determined threshold of 22.5 degrees may be changed to any other appropriate value.

Unlike transform coefficients which usually concentrate at the top-left section of the block, inter prediction residuals with high absolute values may appear in random positions in a residual block, e.g., in the bottom-right section or top-right section. Thus, to improve coding efficiency, this disclosure teaches multiple starting positions for scanning (MSCAN) of prediction residuals. The MSCAN tools or schemes may choose different starting positions based on a RDO process. For example, when encoding a full significant map of the prediction residuals, a starting position resulting in a least number of encoded bits may be selected as the optimal starting position.

In use, information regarding a starting position may be included into an encoded bitstream to facilitate decoding by a decoder. In an embodiment, to represent different starting positions, a 2-bit syntax element, denoted as (C0, C1), may be included in a bitstream under the context of an HEVC syntax. Consider, for example, a N×N residual block with residual values denoted as Z(m, n), where N is an integer greater than one, m is a column index varying between 0 and N−1, n is a row index varying between 0 and N−1, and Z(m, n) is a residual value at position (m, n). It should be noted that although an N×N square block is used herein for illustrative purposes, a non-square rectangular block may also be similarly used. (C0, C1) may be configured to indicate:

$$(C0, C1) = \begin{cases} 00, & \text{starting from } Z(0, 0); \\ 01, & \text{starting from } Z(N-1, 0); \\ 10, & \text{starting from } Z(0, N-1); \\ 11, & \text{starting from } Z(N-1, N-1). \end{cases}$$

From the (C0, C1) above, a syntax element with binary value '11', for example, equals 3 and may indicate that the scanning of residual values starts from Z(N−1,N−1). It should be understood that an assigned value of the syntax element may be changed within the principle of the present disclosure. For example, if desired, the interpretation of the a '11' syntax element may be changed such that it indicates a starting position of Z(0,N−1).

With a starting position, scanning of prediction residuals may be implemented in various orders. Suppose that an inter-coded residual block comprises prediction residuals in the following order, wherein each line represents a row:

$$Z(0,0) \quad Z(1,0) \quad \ldots \quad Z(N\text{-}2,0) \quad Z(N\text{-}1,0)$$

$$Z(0,1) \quad Z(1,1) \quad \ldots \quad Z(N\text{-}2,1) \quad Z(N\text{-}1,1)$$

$$\ldots \quad \ldots \quad \ldots \quad \ldots \quad \ldots$$

$$Z(0,N\text{-}2) \quad Z(1,N\text{-}2) \quad \ldots \quad Z(N\text{-}2,N\text{-}2) \quad Z(N\text{-}1,N\text{-}2)$$

$$Z(0,N\text{-}1) \quad Z(1,N\text{-}1) \quad \ldots \quad Z(N\text{-}2,N\text{-}1) \quad Z(N\text{-}1,N\text{-}1)$$

In an embodiment, a horizontal scanning order may be used for inter prediction residuals. In this embodiment, the definition of the scanning starting position index may be set as:

Index=00: start scanning residuals from the top-left corner residual. That is, scan the 0-th row from left to right (i.e., from $Z(0,0)$ to $Z(N-1, 0)$), then scan the 1-st row from left to right, . . . , and scan the (N−1)-th row from left to right. Since this scanning order is the same as a raster scanning order, in which residuals are scanned row-by-row from left to right and from top to bottom, the residual block may remain as is (i.e., no need to convert the original residual block to a new residual block). Or, if a new residual block is formed, it is the same as the original residual block.

Index=01: start scanning residuals from the top-right corner residual. That is, scan the 0-th row from right to left (i.e., from $Z(N-1, 0)$ to $Z(0,0)$), then scan the 1-th row from right to left, . . . , and scan the (N−1)-th row from right to left. This scanning order may be considered a raster scan of a new residual block, which is obtained by horizontally flipping the original residual block. Specifically, the new residual block comprises prediction residuals in the following order:

$$Z(N\text{-}1,0) \quad Z(N\text{-}2,0) \quad \ldots \quad Z(1,0) \quad Z(0,0)$$

$$Z(N\text{-}1,1) \quad Z(N\text{-}2,1) \quad \ldots \quad Z(1,1) \quad Z(0,1)$$

$$\ldots \quad \ldots \quad \ldots \quad \ldots \quad \ldots$$

$$Z(N\text{-}1,N\text{-}2) \quad Z(N\text{-}2,N\text{-}2) \quad \ldots \quad Z(1,N\text{-}2) \quad Z(0,N\text{-}2)$$

$$Z(N\text{-}1,N\text{-}1) \quad Z(N\text{-}2,N\text{-}1) \quad \ldots \quad Z(1,N\text{-}1) \quad Z(0,N\text{-}1)$$

Index=10: start scanning residuals from the bottom-left corner residual. That is, scan the (N−1)-th row from left to right, then scan the (N−2)-th row from left to right, . . . , and scan the 0-th row from left to right. This scanning order may be considered a raster scan of a new residual block, which is obtained by vertically flipping the original residual block. Specifically, the new residual block comprises prediction residuals in the following order:

$$Z(0,N\text{-}1) \quad Z(1,N\text{-}1) \quad \ldots \quad Z(N\text{-}2,N\text{-}1) \quad Z(N\text{-}1,N\text{-}1)$$

$$Z(0,N\text{-}2) \quad Z(1,N\text{-}2) \quad \ldots \quad Z(N\text{-}2,N\text{-}2) \quad Z(N\text{-}1,N\text{-}2)$$

$$\ldots \quad \ldots \quad \ldots \quad \ldots \quad \ldots$$

$$Z(0,1) \quad Z(1,1) \quad \ldots \quad Z(N\text{-}2,1) \quad Z(N\text{-}1,1)$$

$$Z(0,0) \quad Z(1,0) \quad \ldots \quad Z(N\text{-}2,0) \quad Z(N\text{-}1,0)$$

Index=11: start scanning residuals from the bottom-right corner residual. That is, scan the (N−1)-th row from right to left, then scan the (N−2)-th row from right to left, . . . , and scan the 0-th row from right to left. This scanning order may be considered a raster scan of a new residual block, which is obtained by rotating the original residual block for 180 degrees. Specifically, the new residual block comprises prediction residuals in the following order:

$$Z(N\text{-}1,N\text{-}1) \quad Z(N\text{-}2,N\text{-}1) \quad \ldots \quad Z(1,N\text{-}1) \quad Z(0,N\text{-}1)$$

$$Z(N\text{-}1,N\text{-}2) \quad Z(N\text{-}2,N\text{-}2) \quad \ldots \quad Z(1,N\text{-}2) \quad Z(0,N\text{-}2)$$

$$\ldots \quad \ldots \quad \ldots \quad \ldots \quad \ldots$$

$$Z(N\text{-}1,1) \quad Z(N\text{-}2,1) \quad \ldots \quad Z(1,1) \quad Z(0,1)$$

$$Z(N\text{-}1,0) \quad Z(N\text{-}2,0) \quad \ldots \quad Z(1,0) \quad Z(0,0)$$

In an embodiment, three separate starting position indexes may be used for three color components (i.e., Luma Y, Chroma U, and Chroma V). For example, a first index denoted as ScanIdxY indicates a starting position index for Y component scanning, a second index denoted as ScanIdxU indicates a starting position index for U component scanning, and a third index denoted as ScanIdxV indicates a starting position index for V component scanning. In an alternative embodiment, two or more of the color components may share a same starting position index.

In an embodiment, the MSCAN scheme may be implemented as described above to form a new residual block, which may then be scanned following a regular zigzag order. The regular zigzag scan starts from the top-left corner residual of the new residual block, winds through all residuals, and ends at the bottom-right corner residual of the new residual block.

Figure 6A:
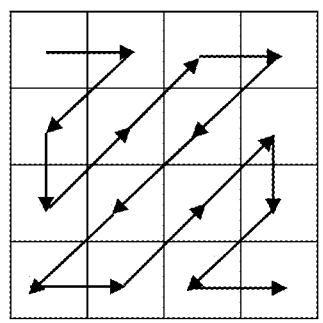
FIGS. 6A-6D are diagrams of embodiments of zigzag scanning patterns.
Figure 6B:
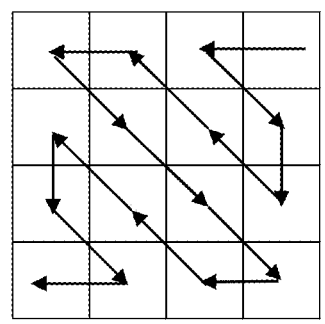
Figure 6C:
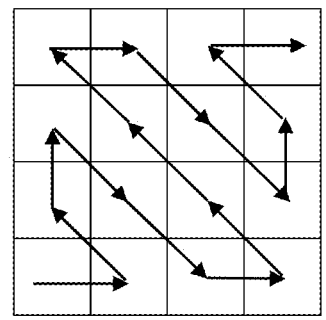
Figure 6D:
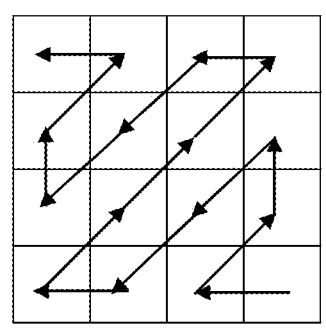

In an alternative embodiment, the disclosed MSCAN scheme may be combined with the regular zigzag scan into a single scanning operation. In this case, no new residual block needs to be formed and various zigzag scanning patterns may be used to code a full significant map of inter-coded residuals in the original residual block. FIGS. 6A-6D illustrate four different embodiments of zigzag scanning patterns, which may be implemented to scan an inter-coded residual block. As shown in FIG. 6A, a zigzag scanning pattern 610 may be implemented when a starting position is the top-left corner residual, which is indicated by a starting position index of 00. The zigzag scanning pattern 610 is the regular zigzag scanning pattern. Similarly, as shown in FIG. 6B, a zigzag scanning pattern 620 may be implemented when a starting position is the top-right corner residual, which is indicated by a starting position index of 01. As shown in FIG. 6C, a zigzag scanning pattern 630 may be implemented when a starting position is the bottom-left corner residual, which is indicated by a starting position index of 10. As shown in FIG. 6D, a zigzag scanning pattern 640 may be implemented when a starting position is the bottom-right corner residual, which is indicated by a starting position index of 11. The arrows in each of FIGS. 6A-6D lay out a sequence in which all residual pixels in the residual block can be scanned. Embodiments of the disclosed MSCAN scheme may improve the coding efficiency of residual blocks generated via either inter or intra prediction.

To accommodate the capability of selecting multiple starting positions in scanning inter/intra prediction residuals, software syntax may be modified accordingly. In an embodiment, a CABAC syntax for residual coding may be specified as Table 3.

TABLE 3

A syntax table for residual coding

| residual_coding_cabac( x0, y0, log2TrafoSize, trafoDepth, scanIdx, cIdx ) { | Descriptor |
|---|---|
|   If (PreMode != MODE_INTRA) | |
|   { | |
|     If (cIdx ==0) && (LosslessCodingFlag==1) | |
|       ScanIdxY | ae(v) |
|     If (cIdx ==1) && (LosslessCodingFlag==1) | |
|       ScanIdxU | ae(v) |
|     If (cIdx ==2) && (LosslessCodingFlag==1) | |
|       ScanIdxV | ae(v) |
|   } | |
|     last_significant_coeff_x | ae(v) |
|     last_significant_coeff_y | ae(v) |
|     n = 0 | |
|     xC = ScanOrder[ log2TrafoSize − 2 ][ scanIdx ][ n ][ 0 ] | |
|     yC = ScanOrder[ log2TrafoSize − 2 ][ scanIdx ][ n ][ 1 ] | |
|     while( ( xC != last_significant_coeff_x ) || ( yC != last_significant_coeff_y ) ) { | |
|       significant_coeff_flag[ xC ][ yC ] | ae(v) |
|       n++ | |
|       xC = ScanOrder[ log2TrafoSize − 2 ][ scanIdx ][ n ][ 0 ] | |
|       yC = ScanOrder[ log2TrafoSize − 2 ][ scanIdx ][ n ][ 1 ] | |
|     } | |
|     numSubsets = max( 1, ( 1 << ( log2TrafoSize << 1 ) ) >> ( cIdx > 0 ? 6 : 4 )) | |
|     for( i = 0; i < numSubsets; i++ ) { | |
|       offset = i << 4 | |
|       xS = ScanOrder[ log2TrafoSize − 2 ][ 0 ][ i ][ 0 ] << 2 | |
|       yS = ScanOrder[ log2TrafoSize − 2 ][ 0 ][ i ][ 1 ] << 2 | |
|       for( n = 0; n < 16; n++ ) { | |
|         xOffset = n − (n >> 2 ) << 2 | |
|         yOffset = n >> 2 | |
|         if( significant_coeff_flag[ xS + xOffset ][ yS + yOffset ] ) | |
|           coeff_abs_level_greater1_flag[ n ] | ae(v) |
|       } | |
|       for( n = 0; n < 16; n++ ) { | |
|         if( coeff_abs_level_greater1_flag[ n ] ) { | |
|           coeff_abs_level_greater2_flag[ n ] | ae(v) |
|           if( coeff_abs_level_greater2_flag[ n ] ) | |
|             coeff_abs_level_minus3[ n ] | ae(v) |
|         } | |
|       } | |
|       for( n = 0; n < 16; n++ ) { | |
|         xOffset = n − (n >> 2 ) << 2 | |
|         yOffset = n >> 2 | |
|         if( significant_coeff_flag[ xS + xOffset ][ yS + yOffset ] ) { | |
|           coeff_sign_flag[ n ] | ae(v) |
|           transCoeffLevel[ x0 ][ y0 ][ trafoDepth ][ cIdx ][ n + offset ] = | |
|             ( coeff_abs_level_minus3[ n ] + 3) * (1 − 2 * coeff_sign_flag[ n ] ) | |
|         } else | |
|           transCoeffLevel[ x0 ][ y0 ][ trafoDepth ][ cIdx ][ n + offset ] = 0 | |
|       } | |
|     } | |
| } | |

In Table 3, a variable, denoted as LosslessCodingFlag, may indicate whether a current block (e.g., a CU) is coded in a lossless mode (e.g., using the transform bypass encoding scheme 100). LosslessCodingFlag may be determined based on a quantization parameter for the Y component ($QP_Y$) of the current block. If $QP_Y=0$, LosslessCodingFlag may be set to 1; otherwise if $QP_Y \neq 0$, LosslessCodingFlag may be set to 0. One skilled in the art will recognize and understand notations and logics in Table 3, thus these aspects will not be further discussed in the interest of conciseness.

Figure 7:
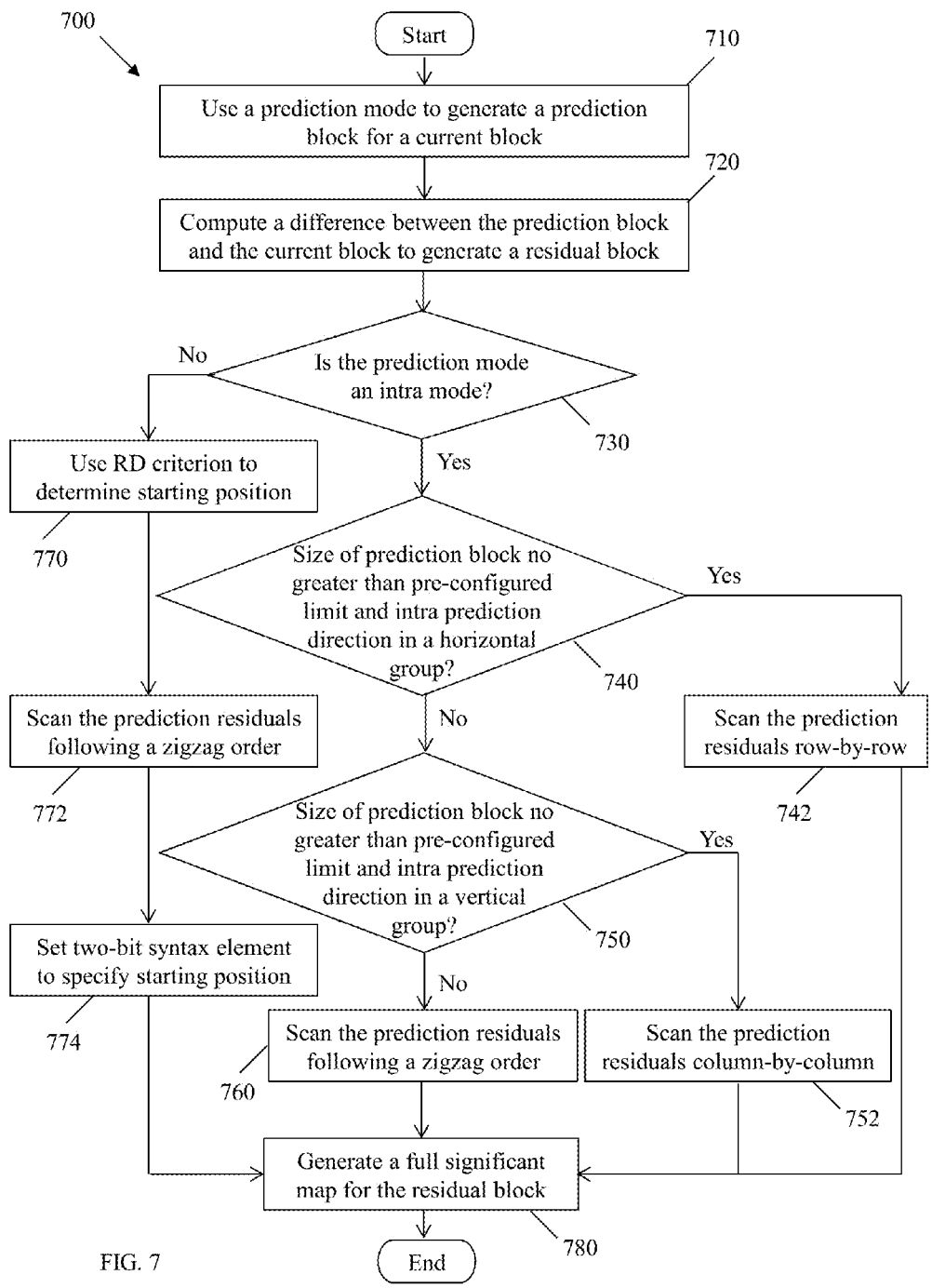
FIG. 7 is a flowchart of an embodiment of an encoding method.

FIG. 7 illustrates an embodiment of an encoding method 700, which may be implemented in a codec as part of an encoding scheme, such as the transform bypass encoding scheme 100 or the quantization without transform encoding scheme 400. The method 700 may starts in step 710, where a prediction block may be generated or computed for a current block in a video frame. The prediction block may be generated via inter prediction using a reference block located in a previously encoded video frame, or via intra prediction using reference pixels located in the same video frame. Further, intra prediction may be implemented using any of a plurality of available intra prediction modes (e.g., up to 35 modes for the Y component and up to 6 modes for the U or V component).

Next, in step 720, a difference between the current block and the prediction block may be computed to generate a residual block. The residual block comprises a plurality of prediction residuals, which may include zero residuals and/or non-zero residuals. In step 730, the method 700 may check whether a prediction mode used to generate the prediction block is an intra prediction mode. If the condition in step 730 is met, the method 700 may proceed to step 740; otherwise, the method 700 may proceed to step 770. In step 740, the method 700 may further check whether a size of the prediction block (e.g., a TU) is no greater than a pre-configured limit (e.g., 8×8) and a direction of the prediction mode belongs to a horizontal group. In an embodiment, a direction of each intra prediction mode in the horizontal group has an angle smaller than 22.5 degrees with a horizontal direction (i.e., direction of mode 2 in FIG. 1). If the condition in step 740 is met, the method 700 may proceed to step 742, where the plurality of prediction residuals may be scanned starting from the top-left corner residual and row-by-row (i.e., following a horizontal order); otherwise, the method 700 may proceed to step 750.

In step 750, the method may further check whether the size of the prediction block is no greater than the pre-configured limit (e.g., 8×8) and the direction of the prediction mode belongs to a vertical group. In an embodiment, a direction of each intra prediction mode in the vertical group has an angle smaller than 22.5 degrees with a vertical direction (i.e., direction of mode 1 in FIG. 1). If the condition in step 750 is met, the method 700 may proceed to step 752, where the plurality of prediction residuals may be scanned starting from the top-left corner residual and column-by-column (i.e., following a vertical order); otherwise, the method 700 may proceed to step 760, where the plurality of prediction residuals may be scanned starting from the top-left corner residual and following a zigzag order (i.e., the zigzag order 610 in FIG. 6A).

If the prediction block was generated via inter prediction, in step 770, the method 700 may use a rate-distortion criterion to determine an optimal starting position of scan. The starting position may be selected from the four corner positions of the residual block. In an embodiment, a starting position leading to a least number of bits needed to encode the full significant map of the residual block may be deemed as the optimal starting position. In step 772, the plurality of prediction residuals may be scanned starting from the optimal starting position and following a zigzag order. In step 774, a two-bit syntax element, denoted as (C0, C1), may be encoded to indicate the optimal starting position. The two-bit syntax element may be inserted into an encoded bitstream, so that a video decoder may use that information to properly recover positions of non-zero prediction residuals.

In step 780, a full significant map may be generated to indicate the position of each non-zero-valued residual pixel and each zero-valued residual pixel, and then the method 700 may end. It should be noted that the method 700 may be modified without departing from the principles of the present disclosure. For example, the steps 740 and 750 may be combined into one step, where the intra prediction mode may be determined to whether belong to a horizontal group, a vertical group, a diagonal group, or be a non-direction mode (e.g., DC mode). Meanwhile, the size of the prediction block may be checked. Afterwards, in an embodiment, a lookup or mapping table (e.g., Table 2) may be used to determine which scanning order should be employed to scan the plurality of prediction residuals. Further, note that scanning may start from positions other than the top-left corner position. Certain steps of the method 700 may be exchanged in order, provided that one step does not depend on another. For example, if desired, step 774 may be executed before or simultaneously with step 772. Moreover, the method 700 may include only a portion of necessary steps in encoding the current block. Thus, if desired, additional steps, such as quantization of prediction residuals after generating the residual block and prior to scanning the prediction residuals, may be added into the method 700.

Figure 8:
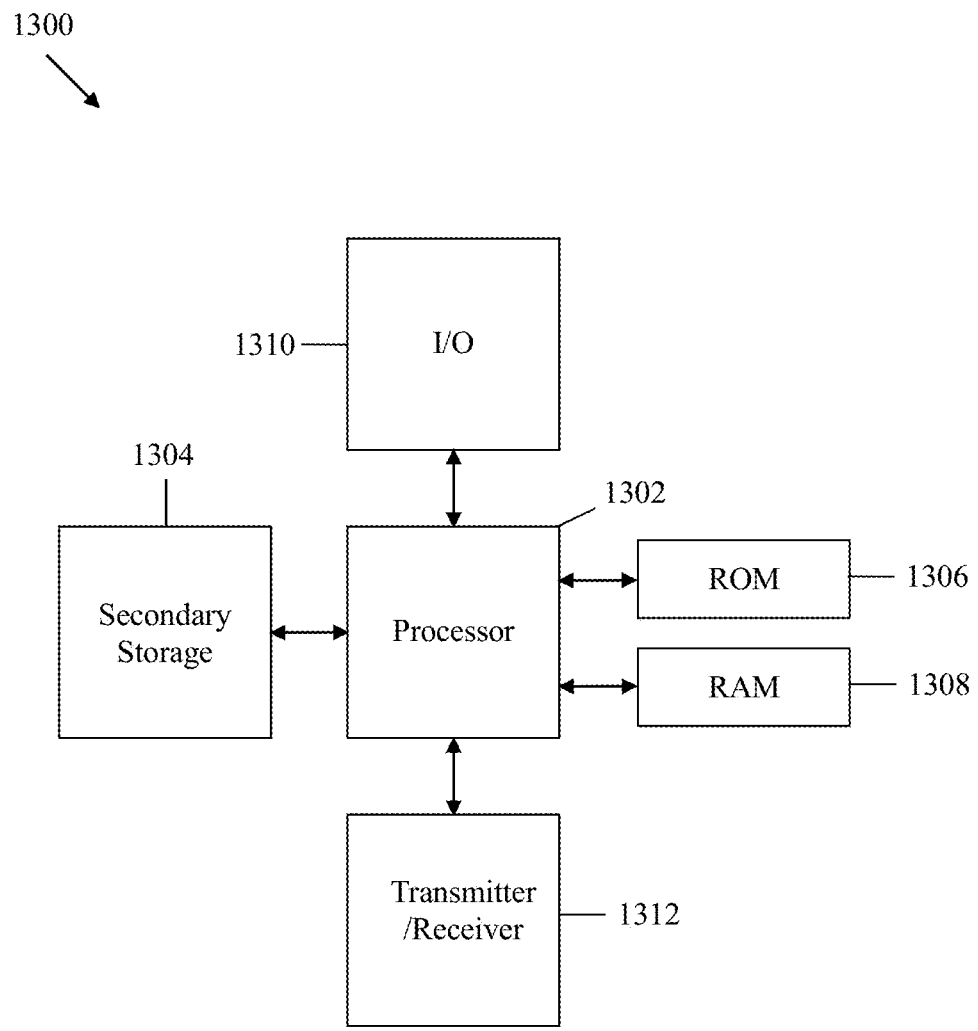
FIG. 8 is a schematic diagram of a computer system.

The schemes described above may be implemented on a network component, such as a computer or network component with sufficient processing power, memory resources, and network throughput capability to handle the necessary workload placed upon it. FIG. 8 illustrates an embodiment of a network component or computer system 1300 suitable for implementing one or more embodiments of the methods disclosed herein, such as the transform bypass encoding scheme 100, the transform bypass decoding scheme 200, the transform without quantization encoding scheme 400, the transform without quantization decoding scheme 500, and the encoding method 700. The network component or computer system 1300 includes a processor 1302 that is in communication with memory devices including secondary storage 1304, read only memory (ROM) 1306, random access memory (RAM) 1308, input/output (I/O) devices 1310, and transmitter/receiver 1312. Although illustrated as a single processor, the processor 1302 is not so limited and may comprise multiple processors. The processor 1302 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the transform bypass encoding scheme 100, the transform bypass decoding scheme 200, the transform without quantization encoding scheme 400, the transform without quantization decoding scheme 500, and the encoding method 700. The processor 1302 may be implemented using hardware or a combination of hardware and software.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304.

The transmitter/receiver 1312 may serve as an output and/or input device of the computer system 1300. For example, if the transmitter/receiver 1312 is acting as a transmitter, it may transmit data out of the computer system 1300. If the transmitter/receiver 1312 is acting as a receiver, it may receive data into the computer system 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the computer system 1300, at least one of the processor 1302, the secondary storage 1304, the RAM 1308, and the ROM 1306 are changed, transforming the computer system 1300 in part into a particular machine or apparatus (e.g., a video codec having the novel functionality taught by the present disclosure). The executable instructions may be stored on the secondary storage 1304, the ROM 1306, and/or the RAM 1308 and loaded into the processor 1302 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A video codec comprising:
a processor configured to:
generate a prediction block for a current block in a video frame;
compute a difference between the current block and the prediction block to generate a residual block;
scan a plurality of prediction residuals located in the residual block following a scanning order;
determine a starting position based on a rate-distortion criterion, wherein scanning the plurality of prediction residuals starts from the starting position, wherein the residual block has a size of N×N, wherein N is an integer greater than one, wherein a position in the residual block is denoted as (m, n), wherein m is a column index varying between 0 and N−1, wherein n is a row index varying between 0 and N−1, and wherein an index specifying the starting position, denoted as (C0, C1), is configured such that:
when (C0, C1) equals 0, the starting position is (0, 0);
when (C0, C1) equals 1, the starting position is (N−1, 0);
when (C0, C1) equals 2, the starting position is (0, N−1); and
when (C0, C1) equals 3, the starting position is (N−1, N−1); and
entropy encode at least one non-zero prediction residual when a plurality of residual values comprises the at least one non-zero prediction residual.

2. The video codec of claim 1, wherein the index is one of three starting position indexes corresponding to the current block, and wherein the three starting position indexes are set for three color components.

3. The video codec of claim 1, wherein the prediction block is generated via inter prediction.

4. The video codec of claim 3, wherein scanning the plurality of prediction residuals starts from a corner residual and follows a row-by-row order, and wherein the processor is further configured to:

after scanning the plurality of prediction residuals following the row-by-row order, scan the plurality of prediction residuals a second time starting from a top-left corner residual and following a zigzag order.

5. The video codec of claim 3, wherein scanning the plurality of prediction residuals starts from a corner residual and follows a zigzag order.

6. A video encoding method comprising:

generating a prediction block for a current block in a video frame;

computing a difference between the current block and the prediction block to generate a residual block;

scanning a plurality of prediction residuals located in the residual block following a scanning order; and determining a starting position based on a rate-distortion criterion, wherein scanning the plurality of prediction residuals starts from the starting position, wherein the residual block has a size of N×N, wherein N is an integer greater than one, wherein a position in the residual block is denoted as (m, n), wherein m is a column index varying between 0 and N−1, wherein n is a row index varying between 0 and N−1, and wherein an index specifying the starting position, denoted as (C0, C1), is configured such that:

when (C0, C1) equals 0, the starting position is (0, 0);
when (C0, C1) equals 1, the starting position is (N−1, 0);
when (C0, C1) equals 2, the starting position is (0, N−1); and
when (C0, C1) equals 3, the starting position is (N−1, N−1); and entropy encoding at least one non-zero prediction residual when a plurality of residual values comprises the at least one non-zero prediction residual.

7. The method of claim 6, further comprising, after scanning the plurality of prediction residuals starting from a corner residual and following a row-by-row order, scanning the plurality of prediction residuals a second time starting from a top-left corner residual and following a zigzag order.

8. The method of claim 6, wherein the prediction block is generated via inter prediction, and wherein scanning the plurality of prediction residuals starts from a corner residual and follows a zigzag order.

\* \* \* \* \*